United States Patent

Ritz, Jr. et al.

[15] 3,661,345

[45] May 9, 1972

[54] HUB TO HUB TAPE CARTRIDGE

[72] Inventors: Theodore Ritz, Jr., 3691 Whitfield, Waterford, Mich. 48095; Joseph M. Richtarcik, 20021 Avalon, St. Clair Shores, Mich. 48080

[22] Filed: May 15, 1968

[21] Appl. No.: 729,469

[52] U.S. Cl. ................................242/199, 242/74.1, 242/76

[51] Int. Cl. .....................................G11b 23/08, B65h 75/28

[58] Field of Search .......................242/55.13, 71.2, 76, 74.1, 242/71.1, 197, 198, 199, 200, 71.8, 71.9, 174

[56] References Cited

UNITED STATES PATENTS

| | | | |
|---|---|---|---|
| 3,065,922 | 11/1962 | Ballauf | 241/55.13 |
| 3,195,828 | 7/1965 | Kuckhoff et al. | 242/74.1 |
| 3,325,113 | 6/1967 | Yamamura et al. | 242/71.2 |
| 3,326,483 | 6/1967 | Ivans | 242/55.13 |
| 3,394,899 | 7/1968 | Schoenmakers | 242/55.13 |
| 3,419,226 | 12/1968 | Sato | 242/55.13 |
| 3,423,038 | 1/1969 | Katzef et al. | 242/55.13 |
| 3,495,787 | 2/1970 | Wallace | 242/199 |

*Primary Examiner*—George F. Mautz
*Attorney*—Howard C. Miskin

[57] ABSTRACT

A hub to hub tape cartridge is disclosed comprising a housing having a component having locator pin apertures therein used in assembly of said cartridge; and a hub having a particular construction of tape lock means thereon; said component having male and female cross posts which mate without locking in a sliding fit to form a pair of spaced apart corner-turning posts for guiding the moving tape; said component also having an integrally formed solid and continuous thinned walled viewing section.

5 Claims, 5 Drawing Figures

INVENTORS
THEODORE RITZ, JR.
JOSEPH M. RICHTARCIK

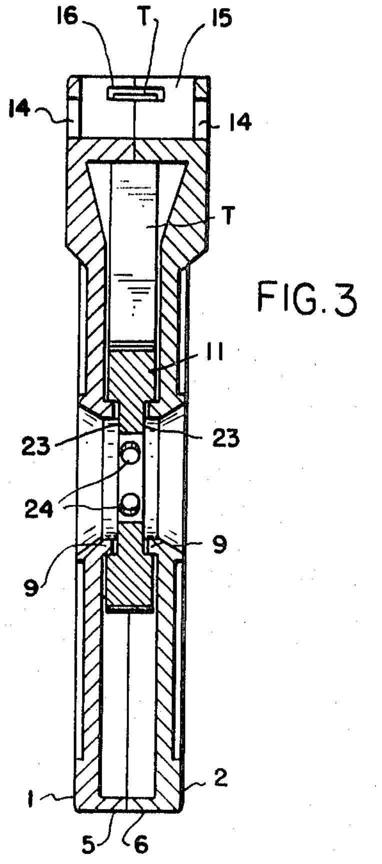
FIG. 3
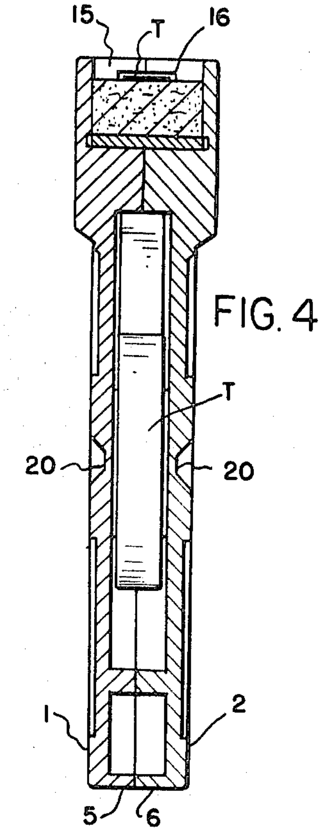
FIG. 4
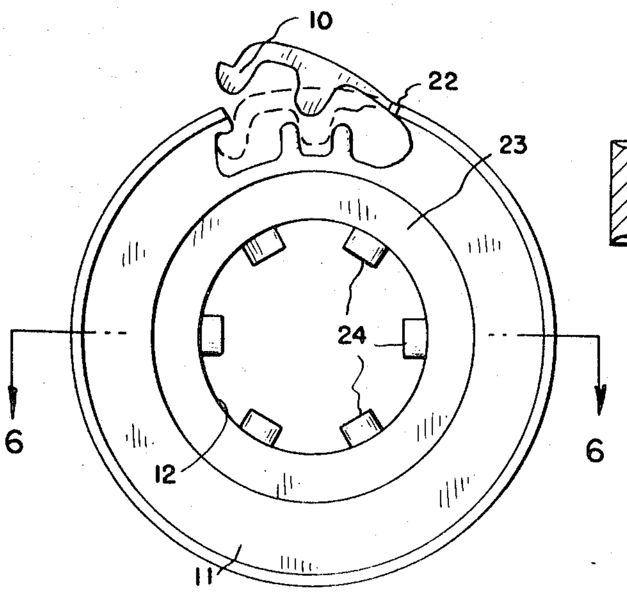
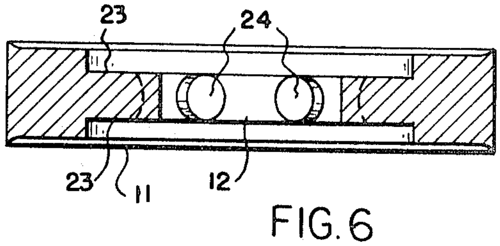
FIG. 6
FIG. 5
INVENTORS
THEODORE RITZ, JR.
JOSEPH M. RICHTARCIK

HUB TO HUB TAPE CARTRIDGE

BACKGROUND OF THE INVENTION

This invention relates generally to tape cartridges and more particularly to a hub to hub tape cartridge of the type used in automobile, home and portable playback machines. At the present cartridges are assembled manually by the use of delicate instruments which must be manipulated with extreme care to avoid damaging the tape or trapping it so as to render the cartridge inoperative or defective.

BRIEF DESCRIPTION OF THE DRAWING

FIG. 3 is a longitudinal sectional view of said cartridge taken along line 3—3 of FIG. 1.

FIG. 4 is a lateral sectional view of said cartridge taken along line 4—4 of FIG. 1.

FIG. 5 is a top plan view of an improved hub for the improved hub to hub tape cartridge of FIG. 1.

FIG. 6 is a lateral sectional view of said hub taken along line 6—6 of FIG. 5.

DETAILED DESCRIPTION OF THE PREFERRED EMBODIMENTS

Figures 1, 2:
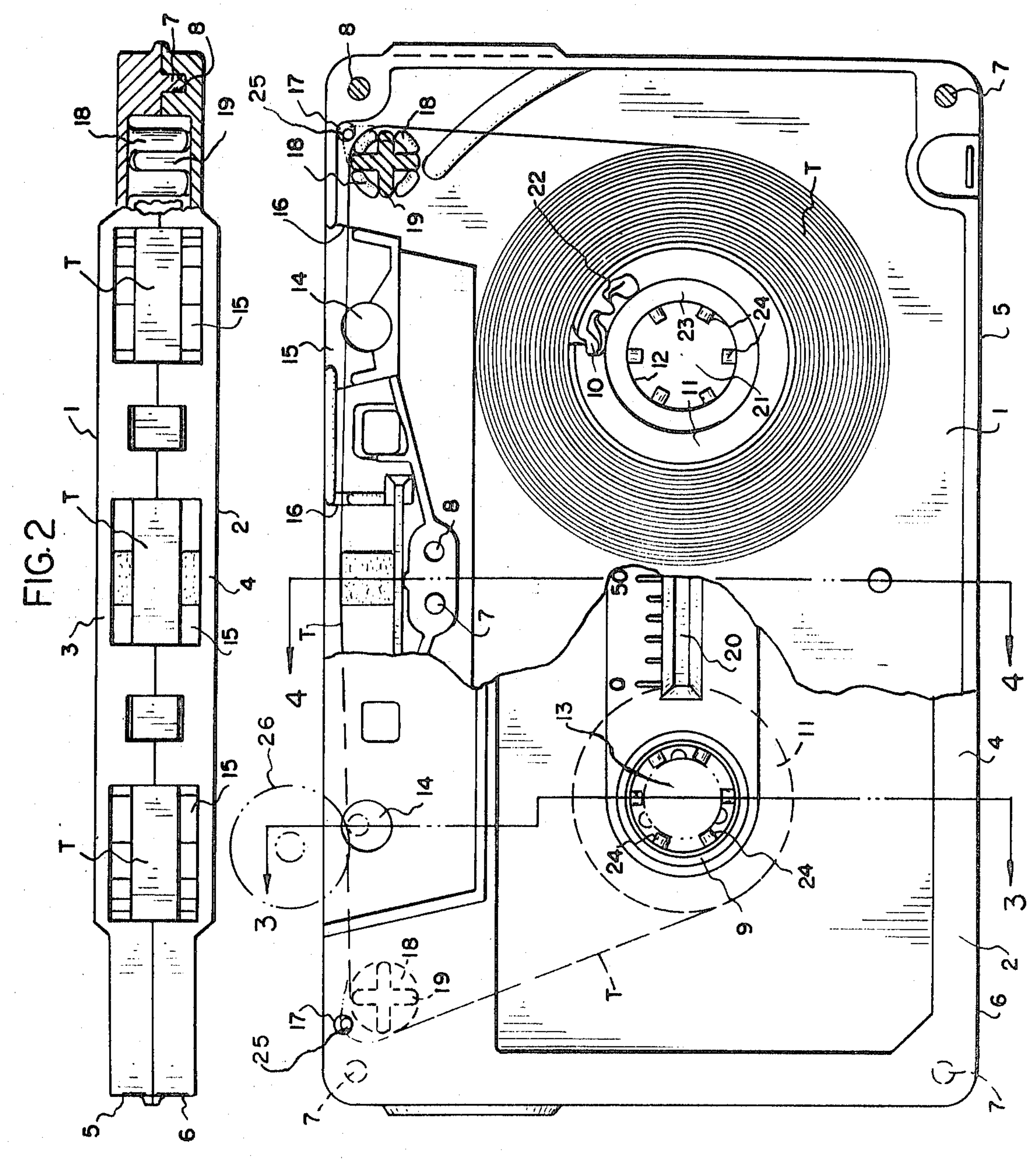
FIG. 1 is a top plan view with parts cut away of an improved hub to hub tape cartridge embodying the invention.
FIG. 2 is a front and elevational view of said cartridge.

Referring to the drawing in greater detail, said cartridge comprises a housing having a base 1 and a removable cover 2. Said base 1 and cover 2 being identical in the instance. The base 1 has a bottom wall 3 and an outer peripheral upright wall 5.

The cover 2 has a top wall 4 and an outer peripheral upright wall 6 which mates with the outer peripheral upright wall 5 to form the side and end walls of the assembled cartridge. The two cartridge halves are held together by means of posts 7 and sleeves 8 which cooperate in a press fit relationship placing the cover 2 and the base 1 under slight compression.

The top wall 4 and bottom wall 3 having a viewing section 20 adjacent to which are graduations for measuring the size of tape coil. Said viewing section 20 forms a visual indicator which allows viewing of the tape coil and eliminates the use of an adhered on window. The housing component (i.e., the base 1 or the cover 2) is integral with and contains said viewing section 20. Said viewing section 20 is formed of a solid and continuous wall having a thickness thinner than that of said component (base 1 or cover 2) so that a tape coil can be viewed through said viewing section 20.

In the front corner of the base 1 and opposite front of the cover 2 inward of the upright outer peripheral walls 5 and 6 and integral with bottom wall 3 and top wall 4 is a male cross post 19 and on opposite such corner of the base 1 and cover 2 respectively is a female cross post 18 in the instance. Said male cross posts 19 and female cross posts 18 coordinate in slip fit mating relationship without locking to form a post which provides feasibility for automatic assembly of the tape T to the base 1 and cover 2 and prevent the accidental trapping of tape T between the base 1 and cover 2 when base 1 and cover 2 are being snapped together. Said male cross post 19 and female cross post 18 of each housing component (base 1 or cover 2) upstand from the front face thereof and form with mating cross posts, when said housing is assembled, a pair of spaced apart corner-turning posts for guiding the moving tape T. The male and female cross posts 19 and 18, respectively, are each formed with four separate circumferentially spaced apart portions having inwardly tapered upper ends to avoid damaging engagements with the tape as the housing is being assembled.

The front end of the cartridge has several openings such as 16 to accommodate the playback, erase or record head of the playback machine in the instance and such as 14 to accommodate the capstan of such machine and such as 17 to accommodate the locator pins 25 at the cartridge loading fixture. Such capstan engages an idler wheel 26 in the playback machine to linearly drive the tape T in its travel from one hub 11 to the other. The apertures 17 are located in the base 1 and cover 2 such that when the locator pins 25 of the cartridge loading fixture are inserted in the apertures 17 and the tape T is wrapped tightly around such locator pins 25 the tape T will allow itself to be readily inserted into the base 1 and cover 2. Said housing component (base 1 or cover 2) has tape guide openings 16 integrally formed with the inside face thereof and at the front thereof between said locater pin apertures 17. Said locater pin apertures 17 are substantially aligned with said tape guide openings 16 so that during assembly of said tape cartridge, when tape T is wrapped around said locater pins 25, said tape T is aligned with said guide openings 16 to facilitate the insertion of said tape T into said component (base 1 or cover 2).

A pair of integral circular flanges 9 project from the inside surfaces of bottom wall 3 and top wall 4 and having a centrally located through holes 21. Said flanges 9 serve as bushings for a pair of hubs 11 in the form of a short cylinder having snap lock means 10 conforming with its outside cylindrical surface. The flanges 9 serve to register and contain the hubs 11 for rotation. The through holes 21 provide access in the base 1 and cover 2 for the pintles 13 of the playback machine and cartridge loading fixture.

The flanges 9 projects into the confines of the hub 11 such that the upper and lower peripheral portions of the latter are exterior to and vertically overlaps the former. The outside diameter of the flanges 9 are maintained close enough to the inside diameter of the upper and lower peripheral portions of the hub 11 so that with such projection of the flanges 9 and exterior overlapping of the hub 11 the inner convolutes of the coiled tape T are prevented from creeping over or under and into the interior of the hub 11 which otherwise would cause the tape to bind between the base 1 or cover 2 and the hub 11.

In the instance the hub 11 has a bushing 23 which can bear against the outer diameter of the flange 9 for rotation. A series of projections 24 about the innermost diameter 12 of hub 11 engage the pintals 13 from the playback machine or loading fixture for playback rotation with the former or for assembly of the cartridge with the latter. A snap lock means 10 traps the tape T to the hub 11 and secures tape T for winding it about the hub 11. Such snap lock means 10 has an arm integral with the body of said hub 11 and has a hinge 22 which allows the snap lock means 10 to engage and lock to the hub 11 without breaking or deforming the snap lock means 10. Said snap lock means 10 includes protuberant male lock means on said arm and female lock means in said hub body circumferentially spaced from said hinge 22. Said female lock means has two spaced apart reaction portions between which said male lock means is under compression when snapped into said female lock means during assembly of said tape cartridge. The end of tape T extends between said male and female lock means and over both said spaced apart reaction portions when held by said snap lock means 10.

Mating vertical walls on the cover 2 and the base 1 form tape guide openings 16 at the front end of the cartridge which maintain the vertical position of the tape T in the playback heads or sensing devices of the playback machine. The openings 16 also maintain the tape T in a bowed position under tension about each such sensing device of the playback machine.

It will thus be seen that there has been provided by the present invention a hub to hub tape cartridge in which the object together with many other thoroughly practical advantages has been successfully achieved. While a preferred embodiment of the invention has been shown and described it is to be understood that variations and changes may be resorted to without departing from the spirit of the invention.

We claim:

1. A hub to hub tape cartridge constructed to be assembled on a loading fixture having at least two spaced apart locator pins, said cartridge comprising a housing having a component having at least two spaced apart locator pin apertures in the front corners thereof, respectively, for receiving said locator pins, said component also having tape guide openings integrally formed with the inside face thereof and at the front thereof between said locator pin apertures, said locator pin apertures substantially aligned with said tape guide openings so that during assembly of said tape cartridge, when tape is wrapped around said locator pins, said tape is aligned with said tape guide openings to facilitate the insertion of said tape into said component.

2. A hub to hub tape cartridge comprising a housing having a component having a male cross post and a female cross post integrally formed with the inside face thereof to upstand therefrom and located, respectively, at the front corners thereof, said male and female cross posts adapted to mate without locking in a sliding fit with mating cross posts on an identical component to ensure alignment therewith when the housing is being assembled, said male and female cross posts forming with said mating cross posts when said housing is assembled a pair of spaced apart corner-turning posts for guiding the moving tape.

3. The tape cartridge as claimed in claim 2 in which the male and female cross posts are inwardly tapered on their upper ends to avoid damaging engagements with the tape as the housing is being assembled.

4. The tape cartridge as claimed in claim 2 in which the male and female cross posts are each formed with four separate circumferentially spaced apart portions having inwardly tapered upper ends.

5. A hub to hub tape cartridge constructed to be assembled on a loading fixture having at least two spaced apart locator pins comprising a housing having a component having at least two spaced apart locator pin apertures in the front corners thereof, respectively, for receiving said locator pins during assembly of said tape cartridge, said component also having tape guide openings integrally formed with the inside face thereof and at the front thereof between said locator pin apertures, said locator pin apertures substantially aligned with said tape guide openings so that during assembly of said tape cartridge, when tape is wrapped around said locator pins, said tape is aligned with said tape guide openings to facilitate the insertion of said tape into said component, said component also having a male cross post and a female cross post integrally formed with the inside face thereof to upstand therefrom and located, respectively, at the front corners thereof outboard of said tape guide openings, said male and female cross posts adapted to mate without locking in a sliding fit with mating cross posts on an identical component to ensure alignment therewith when the housing is being assembled, said male and female cross posts forming with said mating cross posts when said housing is assembled a pair of spaced apart corner-turning posts for guiding the moving tape.

* * * * *